United States Patent
Zhao et al.

(10) Patent No.: US 12,348,120 B2
(45) Date of Patent: Jul. 1, 2025

(54) SWITCHED CAPACITOR VOLTAGE CONVERTER

(71) Applicant: Southchip Semiconductor Technology (Shanghai) Co., Ltd., Shanghai (CN)

(72) Inventors: Wei Zhao, Shanghai (CN); Xing Liang, Shanghai (CN)

(73) Assignee: Southchip Semiconductor Technology (Shanghai) Co., Ltd., Shanghai (CN)

( * ) Notice: Subject to any disclaimer, the term of this patent is extended or adjusted under 35 U.S.C. 154(b) by 180 days.

(21) Appl. No.: 17/982,529

(22) Filed: Nov. 8, 2022

(65) Prior Publication Data

US 2023/0155478 A1 May 18, 2023

(30) Foreign Application Priority Data

Nov. 12, 2021 (CN) .......................... 202111337159.9

(51) Int. Cl.
*H02M 1/088* (2006.01)
*H02M 1/00* (2006.01)
*H02M 3/07* (2006.01)
*H02M 3/158* (2006.01)

(52) U.S. Cl.
CPC ......... *H02M 1/0058* (2021.05); *H02M 1/088* (2013.01); *H02M 3/07* (2013.01); *H02M 3/1584* (2013.01)

(58) Field of Classification Search
CPC ........... G11C 5/145; H02M 7/06; H02M 7/10; H02M 7/19; H02M 7/25; H02M 3/07–073

See application file for complete search history.

(56) References Cited

U.S. PATENT DOCUMENTS

2016/0352218 A1 12/2016 Stauth et al.
2020/0358352 A1* 11/2020 Rizzolatti ............... H02M 3/01

FOREIGN PATENT DOCUMENTS

| CN | 110165892 | 8/2019 |
| CN | 110729888 | 11/2020 |
| CN | 114070041 | 2/2022 |
| EP | 2722979 | 4/2014 |

OTHER PUBLICATIONS

"Office Action of Korea Counterpart Application", issued on Jun. 24, 2024, with English translation thereof, p. 1-p. 7.

* cited by examiner

*Primary Examiner* — Bryan R Perez

(57) ABSTRACT

A switched capacitor voltage converter includes an inductor and a plurality of switch transistors between two branches of a conventional parallel switched capacitor voltage converter, by controlling a turning on and off of the plurality of switch transistors, electric charges on a parasitic capacitor of a first branch are completely transferred to a second branch via the inductor within a period of time when all primary switch transistors are turned off, so that a voltage difference between both terminals of each of the primary switch transistors becomes zero, then the each of the primary switch transistors is turned on, the voltage difference between both terminals of the each of the primary switch transistors becomes zero at an instant when the each of primary switch transistors is turned on respectively, therefore a switching loss of the plurality of switch transistors is reduced and a conversion efficiency is improved.

6 Claims, 14 Drawing Sheets

SWITCHED CAPACITOR VOLTAGE CONVERTER

CROSS-REFERENCE TO RELATED APPLICATION

This application claims priority to Chinese Patent Application No. 202111337159.9, filed on Nov. 12, 2021, which is hereby incorporated by reference in its entirety.

TECHNICAL FIELD

The present application belongs to the field of switching power supply, and particularly relates to a switched capacitor voltage converter.

BACKGROUND

A switched capacitor voltage converter has a basic power conversion structure and is widely used in a variety of power management applications to convert an input direct current (DC) voltage to another DC voltage and output.

FIG. 1 shows a conventional two-branch parallel 2:1 switched capacitor voltage converter, and a branch A of a circuit of the switched capacitor voltage converter transfers electric charges from an input terminal to an output terminal through a first switch transistor Q1A to a fourth switch transistor Q4A and a first capacitor CFA, in the same way, a branch B transfers electric charges from the input terminal to the output terminal through a fifth switch transistor Q1B to an eighth switch transistor Q4B and a second capacitor CFB, so as to finally realize an output voltage VOUT=VIN/2 and an output current IOUT=2*IIN.

Conversion efficiency is an important index of a switched capacitor voltage converter, the conversion efficiency determines a load capacity and temperature rise of the switched capacitor voltage converter. The higher the conversion efficiency, the greater the load capacity of the switched capacitor voltage converter and the lower the temperature rise. The main losses of the switched capacitor voltage converter come from: 1) Conduction loss of each switch transistor in the circuit; 2) Switching loss when each switch transistor is switched; 3) Driving loss of each switch transistor. A key to improving the conversion efficiency is how to reduce the above-mentioned losses. The switching loss is proportional to the voltage difference between both terminals of each switch transistor when switched, and the greater the voltage difference, the greater the switching loss. Therefore, the current two-branch parallel switched capacitor voltage converter has problems of low conversion efficiency and large switching loss, which limit the conversion efficiency of the switched capacitor voltage converters.

SUMMARY

In order to overcome the above-mentioned problems, and particularly to the switching loss, embodiments of the present application provide a switched capacitor voltage converter, a voltage difference between both terminals of each switch transistor when switched is decreased to be close to zero or is zero, thereby reducing switching loss and improving conversion efficiency.

An inductor and several switch transistors are added between two branches of a conventional switched capacitor voltage converter to obtain the switched capacitor voltage converter of the embodiments of the present application, in the switched capacitor voltage converter of the embodiments of the present application, by controlling the turning on and off of these switch transistors, an electric charge or electric charges on parasitic capacitors of one branch are completely transferred to another branch via the inductor within a short period of time after all primary switch transistors are turned off, so that the voltage difference between both terminals of each of the primary switch transistors becomes zero, and then the primary switch transistors are started to be turned on respectively, the voltage difference between both terminals of each of the primary switch transistors is zero at the moment when the primary switch transistors are turned on, thereby reducing the switching loss of the switch transistors and improving the conversion efficiency of the switched capacitor voltage converter.

The technical solution of the present application relates to a switched capacitor voltage converter, which is a two-branch parallel 2:1 switched capacitor voltage converter and includes an inductive branch and two branches, the two branches include a first branch and a second branch, and an input voltage, upon travelling via the two branches, is converted into another voltage and output. The inductive branch is connected to the first branch and the second branch, and switch transistors in the first branch and the second branch are primary switch transistors. The inductive branch is configured to transfer an electric charge or electric charges on parasitic capacitors of one branch to another branch of the two branches after all the primary switch transistors are turned off, so that a voltage difference between both terminals of each of the primary switch transistors becomes zero, and then the each of the primary switch transistors is turned on, the voltage difference between both terminals of the each of the primary switch transistors becomes zero at an instant when the each of primary switch transistors is turned on respectively.

Furthermore, the first branch includes a first switch transistor, a second switch transistor, a third switch transistor, a fourth switch transistor and a first capacitor, and the second branch includes a fifth switch transistor, a sixth switch transistor, a seventh switch transistor, an eighth switch transistor and a second capacitor.

A first terminal of the first switch transistor and a first terminal of the fifth switch transistor are connected to an input terminal of the switched capacitor voltage converter, and the input terminal is connected to an external input voltage, a second terminal of the first switch transistor is connected to a first terminal of the second switch transistor and a first terminal of the first capacitor, and a second terminal of the fifth switch transistor is connected to a first terminal of the sixth switch transistor and a first terminal of the second capacitor.

A second terminal of the second switch transistor is connected to a first terminal of the third switch transistor, and a second terminal of the sixth switch transistor is connected to a first terminal of the seventh switch transistor.

A second terminal of the third switch transistor is connected to a second terminal of the first capacitor and a first terminal of the fourth switch transistor, and a second terminal of the seventh switch transistor is connected to a second terminal of the second capacitor and a first terminal of the eighth switch transistor.

A second terminal of the fourth switch transistor and a second terminal of the eighth switch transistor are grounded.

The second terminal of the second switch transistor, the first terminal of the third switch transistor, the second terminal of the sixth switch transistor and the first terminal of the seventh switch transistor are connected to an output terminal of the switched capacitor voltage converter.

The inductive branch includes a ninth switch transistor, a tenth switch transistor, an eleventh switch transistor, a twelfth switch transistor and an inductor.

The second terminal of the first capacitor, the second terminal of the third switch transistor and the first terminal of the fourth switch transistor are connected to a first connection node, and the second terminal of the second capacitor, the second terminal of the seventh switch transistor and the first terminal of the eighth switch transistor are connected to a second connection node, and a first terminal of the ninth switch transistor is connected to the first connection node, a second terminal of the ninth switch transistor is connected to a first terminal of the tenth switch transistor and a first terminal of the inductor, and a second terminal of the tenth switch transistor is grounded.

A second terminal of the inductor is connected to a first terminal of the eleventh switch transistor and a first terminal of the twelfth switch transistor, a second terminal of the eleventh switch transistor is grounded, and a second terminal of the twelfth switch transistor is connected to the second connection node.

Furthermore, the first terminal of the first capacitor, the second terminal of the first switch transistor and the first terminal of the second switch transistor are connected to a first terminal of the ninth switch transistor, a second terminal of the ninth switch transistor is connected to a first terminal of the tenth switch transistor and a first terminal of the inductor, and a second terminal of the tenth switch transistor is connected to the output terminal of the switched capacitor voltage converter.

The first terminal of the second capacitor, the second terminal of the fifth switch transistor and the first terminal of the sixth switch transistor are connected to a second terminal of the twelfth switch transistor, a first terminal of the twelfth switch transistor is connected to a first terminal of the eleventh switch transistor and a second terminal of the inductor, and a second terminal of the eleventh switch transistor is connected to the output terminal of the switched capacitor voltage converter.

Furthermore, the first terminal of the first capacitor, the second terminal of the first switch transistor and the first terminal of the second switch transistor are connected to a first terminal of the ninth switch transistor, a second terminal of the ninth switch transistor is connected to a first terminal of the tenth switch transistor and a first terminal of the inductor, and a second terminal of the tenth switch transistor is connected to the input terminal of the switched capacitor voltage converter.

The first terminal of the second capacitor, the second terminal of the fifth switch transistor and the first terminal of the sixth switch transistor are connected to a second terminal of the twelfth switch transistor, a first terminal of the twelfth switch transistor is connected to a first terminal of the eleventh switch transistor and a second terminal of the inductor, and a second terminal of the eleventh switch transistor is connected to the input terminal of the switched capacitor voltage converter.

A first working cycle of the switched capacitor voltage converter includes four phases in sequence as follows.

A first phase: the first switch transistor, the third switch transistor, the sixth switch transistor, the eighth switch transistor, the tenth switch transistor and the twelfth switch transistor are turned on, and remaining switch transistors are turned off, the input voltage is connected to the output terminal via the first capacitor, the second capacitor is connected between the output terminal and a ground, and a current on the inductor is 0.

A second phase: the ninth switch transistor and the twelfth switch transistor are turned on, and remaining switch transistors are turned off, the first connection node and the second connection node are connected via the ninth switch transistor, the inductor and the twelfth switch transistor respectively, the current on the inductor increases and then decreases until the current on the inductor decreases to 0, and the second phase ends when the current on the inductor decreases to 0.

A third phase: the second switch transistor, the fourth switch transistor, the fifth switch transistor, the seventh switch transistor, the ninth switch transistor and the eleventh switch transistor are turned on, and remaining switch transistors are turned off, the first capacitor is connected between the output terminal and the ground, and the input voltage is connected to the output terminal via the second capacitor, and the first connection node is connected to the ground via the ninth switch transistor, the inductor and the eleventh switch transistor respectively; and the current on the inductor is 0.

A fourth phase: the ninth switch transistor and the twelfth switch transistor are turned on, and remaining switch transistors are turned off, and the first connection node and the second connection node are connected via the ninth switch transistor, the inductor and the twelfth switch transistor respectively, and the current on the inductor increases and then decreases until the current on the inductor decreases to 0, and the fourth phase ends and the first phase is entered when the current on the inductor decreases to 0.

A second working cycle of the switched capacitor voltage converter includes four phases in sequence as follows.

A first phase: the first switch transistor, the third switch transistor, the sixth switch transistor, the eighth switch transistor, the tenth switch transistor and the eleventh switch transistor are turned on, and remaining switch transistors are turned off, the input voltage is connected to the output terminal via the first capacitor, the second capacitor is connected between the output terminal and a ground, and a current on the inductor is 0.

A second phase: the ninth switch transistor and the twelfth switch transistor are turned on, and remaining switch transistors are turned off, the first connection node and the second connection node are connected via the ninth switch transistor, the inductor and the twelfth switch transistor respectively, and the current on the inductor increases and then decreases until the current on the inductor decreases to 0, and the second phase ends when the current on the inductor decreases to 0.

A third phase: the second switch transistor, the fourth switch transistor, the fifth switch transistor, the seventh switch transistor, the tenth switch transistor and the eleventh switch transistor are turned on, and remaining switch transistors are turned off, the first capacitor is connected between the output terminal and the ground, the input voltage is connected to the output terminal via the second capacitor, and both terminals of the inductor are connected to the ground via the tenth switch transistor and the eleventh switch transistor respectively; and the current on the inductor is 0.

A fourth phase: the ninth switch transistor and the twelfth switch transistor are turned on, and remaining switch transistors are turned off, and the first connection node and the second connection node are connected via the ninth switch transistor, the inductor and the twelfth switch transistor respectively, and the current on the inductor increases and then decreases until the current on the inductor decreases to 0, and the fourth phase ends and the first phase is entered when the current on the inductor decreases to 0.

The inductor and the several switch transistors are added between two branches of a conventional switched capacitor voltage converter to obtain the switched capacitor voltage converter of the embodiments of the present application, in the switched capacitor voltage converter the embodiments of the present application, by controlling the turning on and off of these switch transistors, the electric charges on the parasitic capacitors of one branch are completely transferred to another branch via the inductor during the dead time when all the primary switch transistors are turned off, thereby achieving zero voltage switching of all the primary switch transistors.

To make the aforementioned more comprehensible, several embodiments accompanied with drawings are described in detail as follows.

BRIEF DESCRIPTION OF THE DRAWINGS

To describe the technical solutions in embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF THE EMBODIMENTS

To describe the technical solutions in embodiments of the present application more clearly, the following briefly describes the accompanying drawings required for describing the embodiments. It should be noted that, the embodiments of the present application and the features in the different embodiments may be combined with each other under the condition that they do not conflict with each other.

Figure 1:
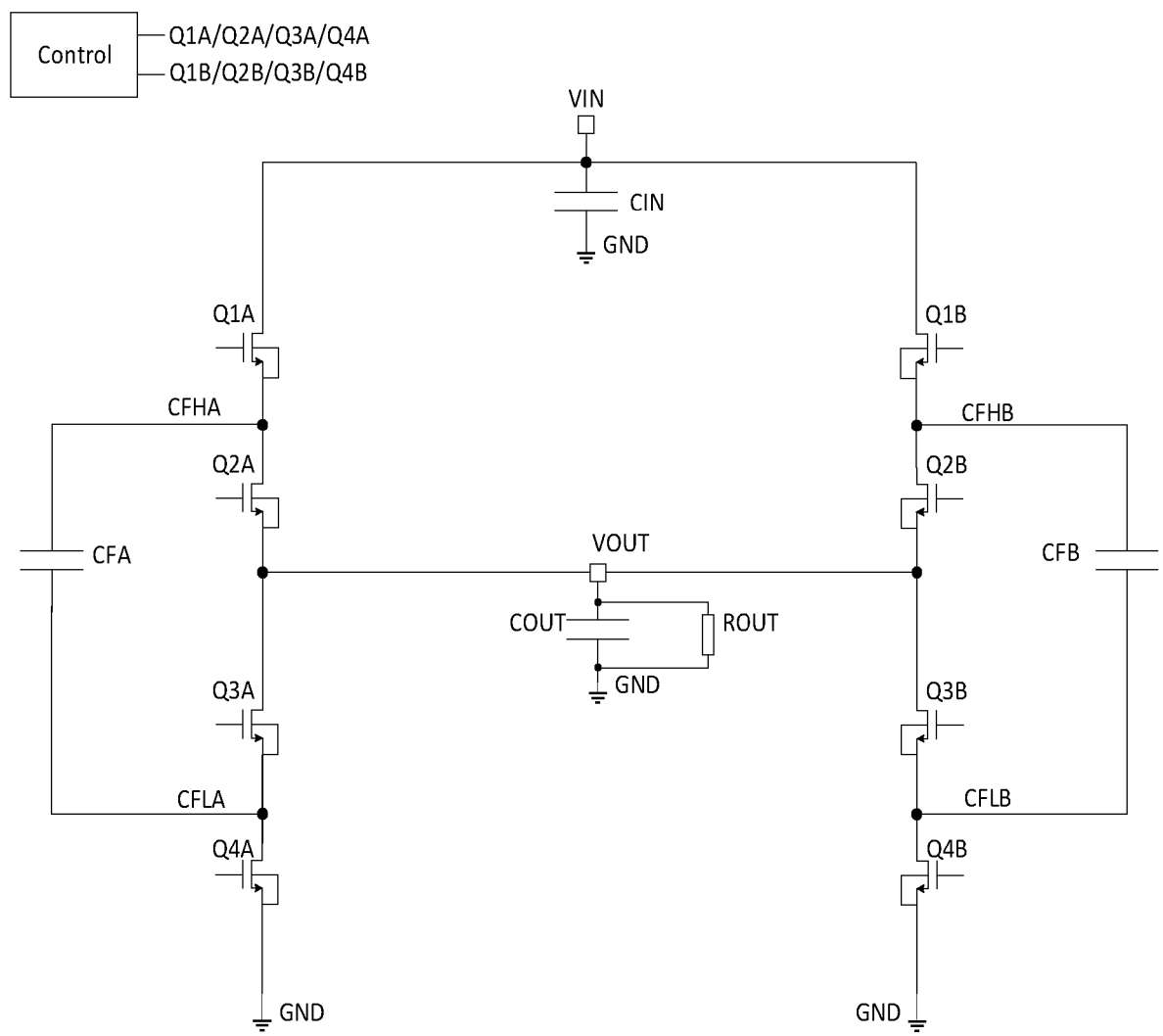
FIG. 1 is a schematic diagram of the circuit structure of a conventional two-branch parallel 2:1 switched capacitor voltage converter.
Figure 2:
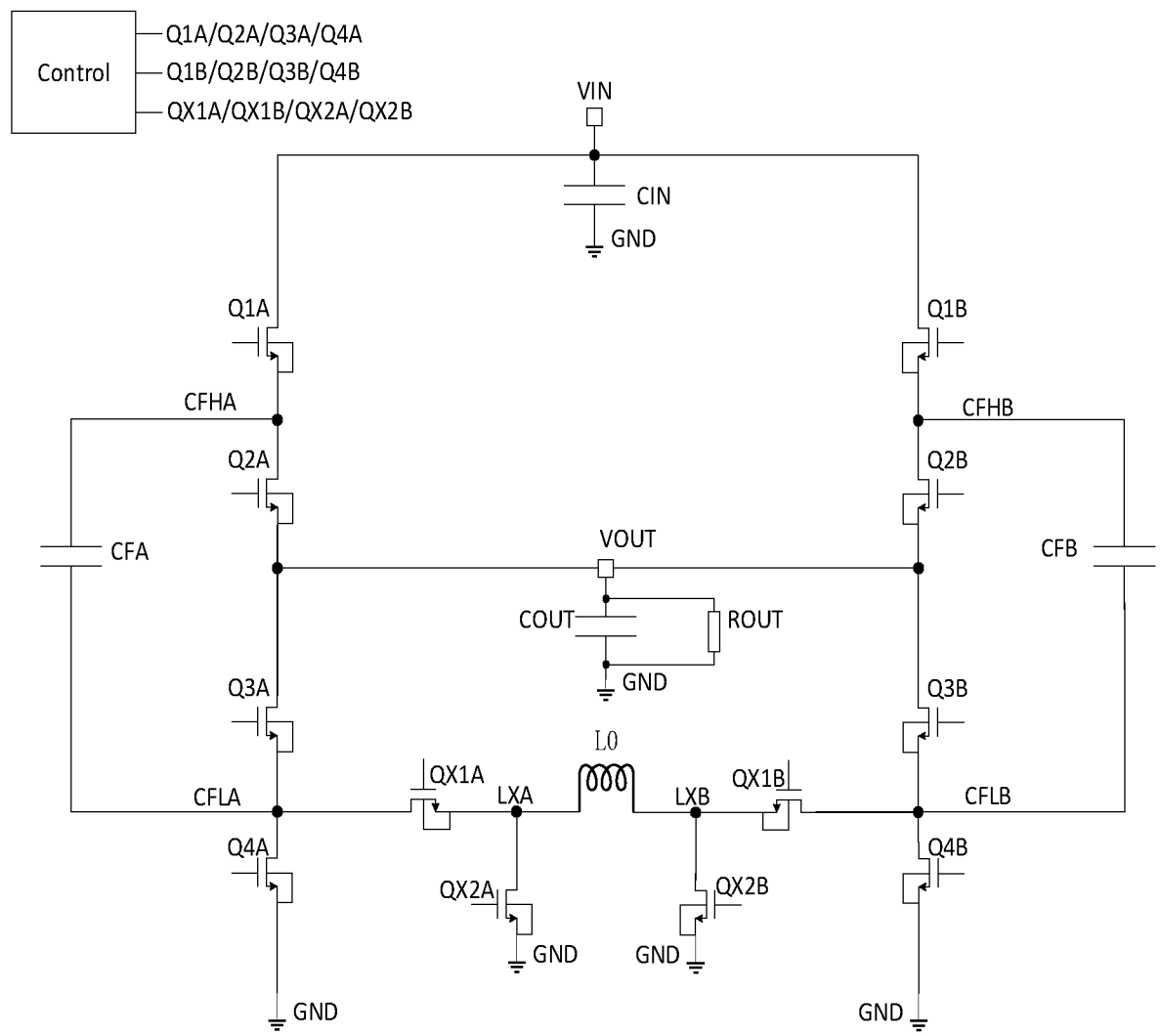
FIG. 2 is a schematic diagram of the circuit structure of a two-branch parallel 2:1 switched capacitor voltage converter of an embodiment of the present application.

FIG. 2 shows a circuit of a two-branch parallel 2:1 switched capacitor voltage converter of an embodiment of the present application, and the two-branch parallel 2:1 switched capacitor voltage converter includes an inductive branch and two branches, and the two branches include a first branch and a second branch.

The first branch includes a first switch transistor Q1A, a second switch transistor Q2A, a third switch transistor Q3A, a fourth switch transistor Q4A and a first capacitor CFA, and the second branch includes a fifth switch transistor Q1B, a sixth switch transistor Q2B, a seventh switch transistor Q3B, an eighth switch transistor Q4B and a second capacitor CFB. All switch transistor in the first branch and the second branch are primary switch transistors, and each primary switch transistor has a parasitic capacitor. For example, each of the first switch transistor Q1A, the second switch transistor Q2A, the third switch transistor Q3A, the fourth switch transistor Q4A, the fifth switch transistor Q1B, the sixth switch transistor Q2B, the seventh switch transistor Q3B and the eighth switch transistor Q4B has a parasitic capacitor.

An VIN presents an input voltage, the VIN is connected to a ground (GND) via a capacitor CIN, the VIN is connected to a node CFHA via the first switch transistor Q1A, the node CFHA is connected to an output voltage VOUT via the second switch transistor Q2A, the node CFHA is connected to a first connection node CFLA via the first capacitor CFA, the third switch transistor Q3A is connected between the output voltage VOUT and the first connection node CFLA, and the first connection node CFLA is connected to the GND via the fourth switch transistor Q4A.

Similarly, the VIN is connected to a node CFHB via the fifth switch transistor Q1B, the node CFHB is connected to the output voltage VOUT via the sixth switch transistor Q2B, the node CFHB is connected to a second connection node CFLB via the second capacitor CFB, the seventh switch transistor Q3B is connected between the output voltage VOUT and the second connection node CFLB, and the second connection node CFLB is connected to the GND via the eighth switch transistor Q4B.

For example, a first terminal of the first switch transistor Q1A and a first terminal of the fifth switch transistor Q1B are connected to an input terminal of the switched capacitor voltage converter, and the input terminal is connected to an external input voltage, a second terminal of the first switch transistor Q1A is connected to a first terminal of the second switch transistor Q2A and a first terminal of the first capacitor CFA, and a second terminal of the fifth switch transistor Q1B is connected to a first terminal of the sixth switch transistor Q2B and a first terminal of the second capacitor CFB.

A second terminal of the second switch transistor Q2A is connected to a first terminal of the third switch transistor Q3A, and a second terminal of the sixth switch transistor Q2B is connected to a first terminal of the seventh switch transistor Q3B.

A second terminal of the third switch transistor Q3A is connected to a second terminal of the first capacitor CFA and a first terminal of the fourth switch transistor Q4A, and a second terminal of the seventh switch transistor Q3B is connected to a second terminal of the second capacitor CFB and a first terminal of the eighth switch transistor Q4B.

A second terminal of the fourth switch transistor Q4A and a second terminal of the eighth switch transistor Q4B are grounded.

The second terminal of the second switch transistor Q2A, the first terminal of the third switch transistor Q3A, the second terminal of the sixth switch transistor Q2B and the first terminal of the seventh switch transistor Q3B are connected to an output terminal of the switched capacitor voltage converter.

The output voltage VOUT is connected to a first terminal of a capacitor COUT, a second terminal of the capacitor COUT is connected to the GND, and meanwhile a load resistance ROUT is connected between the output voltage VOUT and the GND.

The inductive branch is connected between the two branches of the two-branch 2:1 switched capacitor voltage converter described above, and the inductive branch includes a ninth switch transistor QX1A, a tenth switch transistor QX2A, an eleventh switch transistor QX2B, a twelfth switch transistor QX1B and an inductor L0.

The first connection node CFLA is connected to a node LXA via the ninth switch transistor QX1A, the node LXA is connected to the GND via the tenth switch transistor QX2A, the second connection node CFLB is connected to a node LXB via the twelfth switch transistor QX1B, the node LXB is connected to the GND via the eleventh switch transistor QX2B, and the node LXA and the node LXB are connected via the inductor L0.

Figure 3:
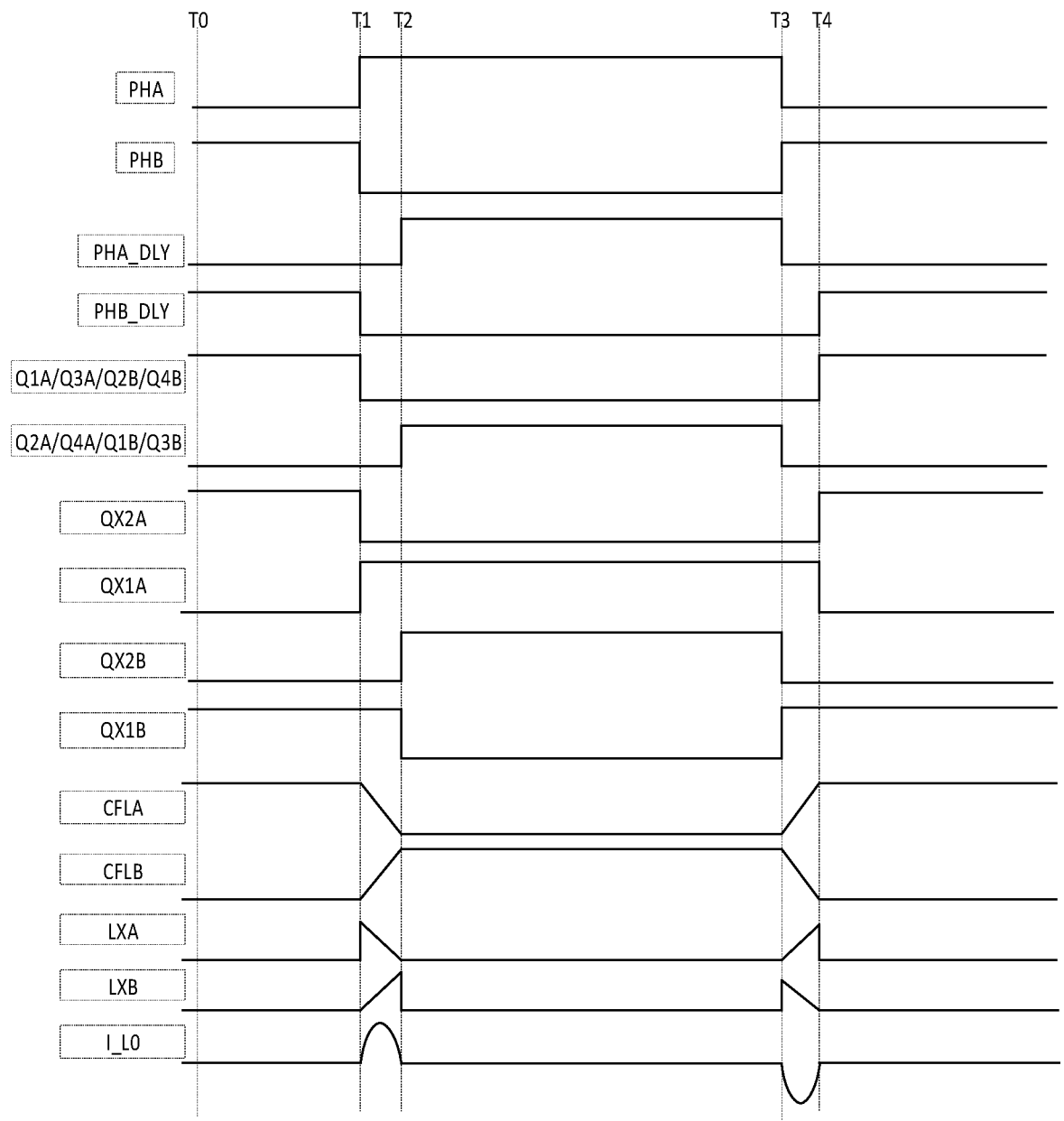
FIG. 3 is a first working cycle diagram of an embodiment of the present application.

FIG. 3 shows a working sequence of the switched capacitor voltage converter of an embodiment of the present application, there are four working states of phase 1 (T0-T1), phase 2 (T1-T2), phase 3 (T2-T3) and phase 4 (T3-T/4) in sequence within one working cycle, as shown in FIG. 3, four voltage patterns corresponding to Q1A, Q3A, Q2B and Q4B present on-off state of the first switch transistor Q1A, the third switch transistor Q3A, the sixth switch transistor Q2B and the eighth switch transistor Q4B respectively, four voltage patterns corresponding to Q2A, Q4A, Q1B and Q3B shown in FIG. 3 present on-off state of the second switch transistor Q2A, the fourth switch transistor Q4A, the fifth switch transistor Q1B and the seventh switch transistor Q3B respectively, four voltage patterns corresponding to QX2A, QX1A, QX2B and QX1B shown in FIG. 3 present on-off state of the tenth switch transistor QX2A, the ninth switch transistor QX1A, the eleventh switch transistor QX2B and twelfth switch transistor QX1B respectively, two voltage patterns corresponding to CFLA and CFLB shown in FIG. 3 are two voltage waveforms of the first connection node CFLA and second connection node CFLB respectively, two voltage patterns corresponding to LXA and LXB shown in FIG. 3 are two voltage waveforms of the node LXA and node LXB respectively, and a current pattern corresponding to I_L0 shown in FIG. 3 is a current waveform of the inductor L0.

Figure 4:
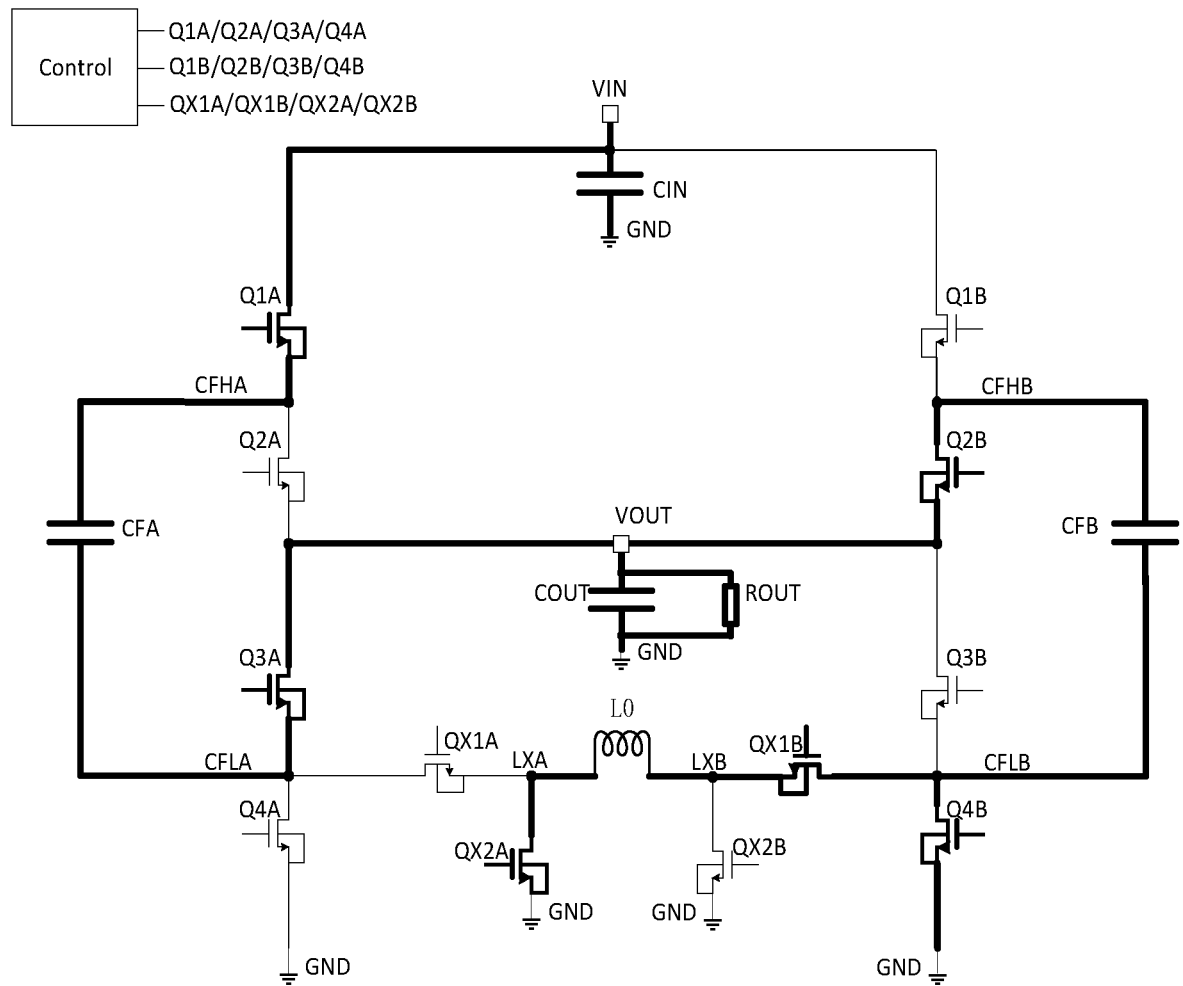
FIG. 4 is a diagram showing a working state of the first phase in the first working cycle as shown in the FIG. 3.

FIG. 4 shows a working state of the switched capacitor voltage converter in the phase 1 (T0-T1). The first switch transistor Q1A and the third switch transistor Q3A are turned on, the second switch transistor Q2A and the fourth switch transistor Q4A are turned off, and the input voltage VIN is connected to the output capacitor COUT via the first capacitor CFA. The fifth switch transistor Q1B and the seventh switch transistor Q3B are turned off, the sixth switch transistor Q2B and the eighth switch transistor Q4B are turned on, and the second capacitor CFB and the output capacitor COUT are connected in parallel. The tenth switch transistor QX2A and the twelfth switch transistor QX1B are turned on, the ninth switch transistor QX1A and the eleventh switch transistor QX2B are turned off, and the second connection node CFLB is connected to the GND via the twelfth switch transistor QX1B, the inductor L0 and the tenth switch transistor QX2A respectively. When the phase 1 starts (i.e., the phase 4 ends), a voltage of the first connection node CFLA is the output voltage VOUT, a voltage of the node CFHA is the input voltage VIN, a voltage difference between both terminals of the third switch transistor Q3A and a voltage difference between both terminals of the first switch transistor Q1A are zero before the third switch transistor Q3A and the first switch transistor Q1A are turned on, and the respective voltage differences of the third switch transistor Q3A and the first switch transistor Q1A do not change before and after being switched on and off. A voltage of the second connection node CFLB is zero, a voltage of the node CFHB is the output voltage VOUT. A voltage difference between both terminals of the eighth switch transistor Q4B and a voltage difference between both terminals of the sixth switch transistor Q2B are zero before the eighth switch transistor Q4B and the sixth switch transistor Q2B are turned on, and the respective voltage differences of the eighth switch transistor Q4B and the sixth switch transistor Q2B do not change before and after being switched on and off. In the phase 1, the voltage of the first connection node CFLA is equal to the output voltage VOUT, the voltage of the second connection node CFLB is equal to zero, the voltage of the node LXA and the voltage of the node LXB are equal to zero, and the current of the inductor L0 is zero.

Figure 5:
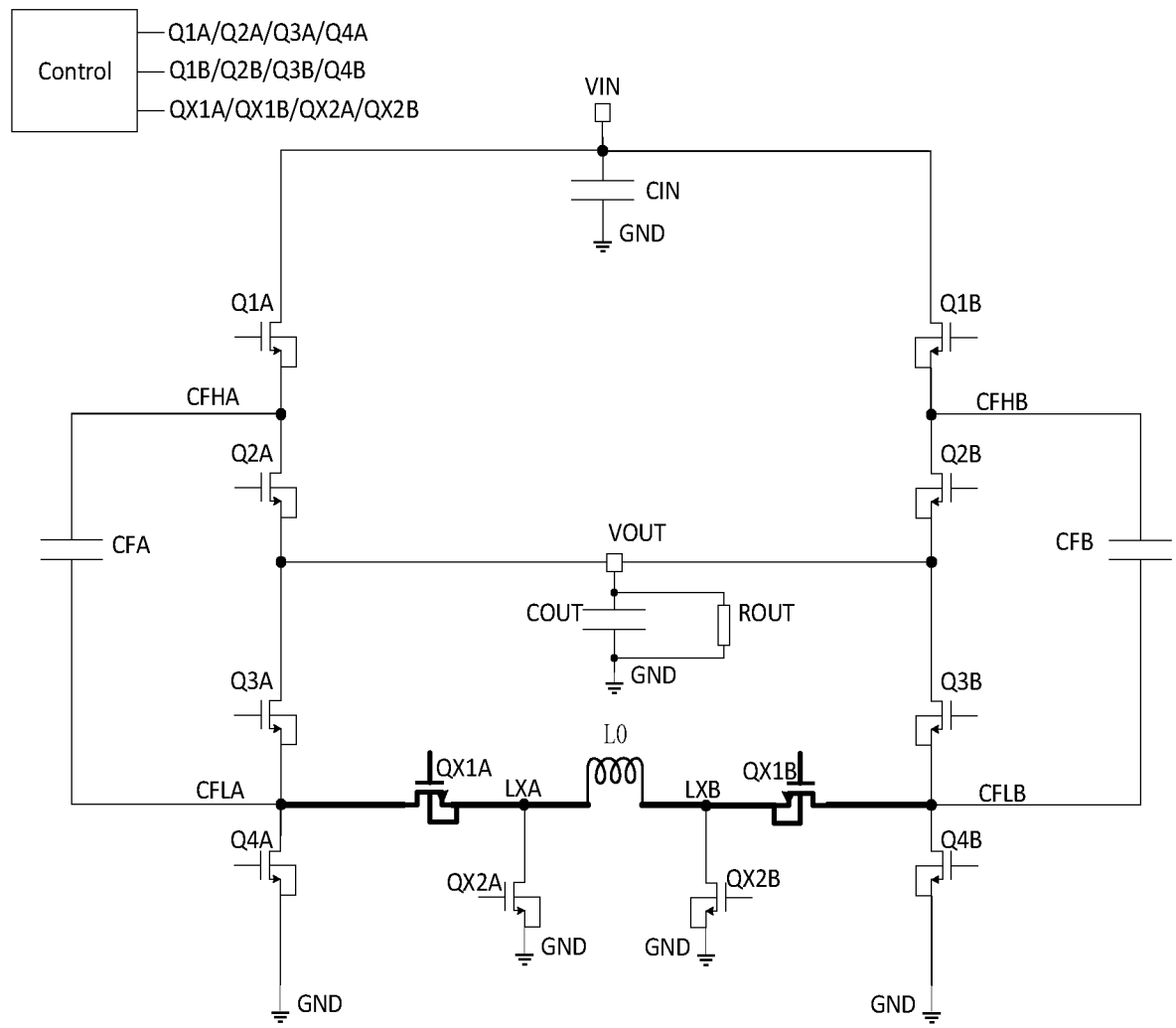
FIG. 5 is a diagram showing a working state of a second phase in the first working cycle as shown in the FIG. 3.

FIG. 5 shows a working state of the switched capacitor voltage converter in the phase 2 (T1-T2). The first switch transistor Q1A, the second switch transistor Q2A, the third switch transistor Q3A, the fourth switch transistor Q4A, the fifth switch transistor Q1B, the sixth switch transistor Q2B, the seventh switch transistor Q3B, and the eighth switch transistor Q4B are turned off, the tenth switch transistor QX2A and the eleventh switch transistor QX2B are turned off, the ninth switch transistor QX1A and the twelfth switch transistor QX1B are turned on, and the first connection node CFLA and the second connection node CFLB are connected via the ninth switch transistor QX1A, the via inductor L0 and the twelfth switch transistor QX1B respectively. When the phase 2 starts, the voltage of the first connection node CFLA is equal to the output voltage VOUT, and the voltage of the second connection node CFLB is equal to zero, and after the first connection node CFLA and the second connection node CFLB are connected via the inductor L0, the current of the inductor L0 flows from the node LXA to the node LXB and starts to increase, the voltage of the first connection node CFLA decreases, and the voltage of the second connection node CFLB increases. When the voltage of the first connection node CFLA and the voltage of the second connection node CFLB are equal, the current of the inductor L0 reaches a maximum value and then starts to decrease. When the current of the inductor L0 decreases to zero, the voltage of the first connection node CFLA decreases to zero, the voltage of the node CFHA decreases to the output voltage VOUT, the voltage of the second connection node CFLB increases to the output voltage VOUT, and the voltage of the node CFHB increases to the input voltage VIN, at this time, the controller controls the switch transistors to end the phase 2 state and start the phase 3.

Figure 6:
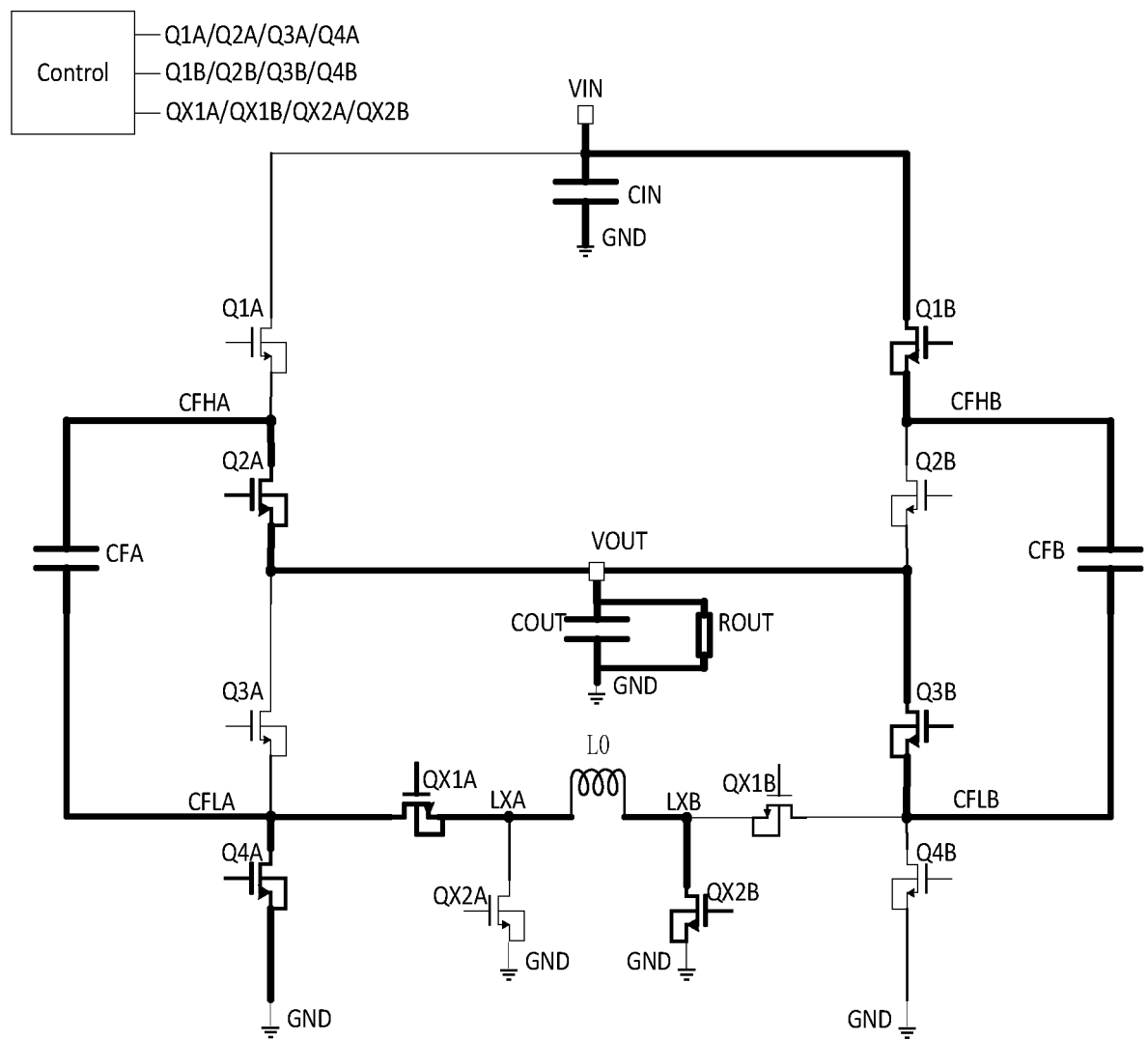
FIG. 6 is a diagram showing a working state of a third phase in the first working cycle as shown in the FIG. 3.

FIG. 6 shows the working state of the switched capacitor voltage converter in the phase 3 (T2-T3). The first switch transistor Q1A and the third switch transistor Q3A are turned off, the second switch transistor Q2A and the fourth switch transistor Q4A are turned on, and the first capacitor CFA and the output capacitor COUT are connected in parallel. The fifth switch transistor Q1B and the seventh switch transistor Q3B are turned on, the sixth switch transistor Q2B and the eighth switch transistor Q4B are turned off, and the input voltage VIN is connected to the output capacitor COUT via the second capacitor CFB. The ninth switch transistor QX1A and the eleventh switch transistor QX2B are turned on, the twelfth switch transistor QX1B and the tenth switch transistor QX2A are turned off, and the first connection node CFLA is connected to GND via the ninth switch transistor QX1A, the inductor L0 and the eleventh switch transistor QX2B respectively. When the phase 2 ends and the phase 3 starts, the voltage of the first connection node CFLA is zero, the voltage of the node CFHA is the output voltage VOUT, and the voltage difference between both terminals of the fourth switch transistor Q4A and the voltage difference between both terminals of the second switch transistor Q2A are zero before the fourth switch transistor Q4A and the second switch transistor Q2A are turned on respectively, and the respective voltage differences of the fourth switch transistor Q4A and the second switch transistor Q2A do not change before and after being switched on and off. The voltage of the second connection node CFLB is the output voltage VOUT, the voltage of the node CFHB is the input voltage VIN, the voltage difference between both terminals of the seventh switch transistor Q3B and the voltage difference between both terminals of the fifth switch transistor Q1B are zero before the seventh switch transistor Q3B and the fifth switch transistor Q1B are turned on respectively, and the respective voltage differences of the seventh switch transistor Q3B and the fifth switch transistor Q1B do not change before and after being switched on and off. In the phase 3, the voltage of the first connection node CFLA is equal to zero, the voltage of the second connection node CFLB is equal to the output voltage VOUT, the voltages of the node LXA and the node LXB are equal to zero, and the current of the inductor L0 is zero.

Figure 7:
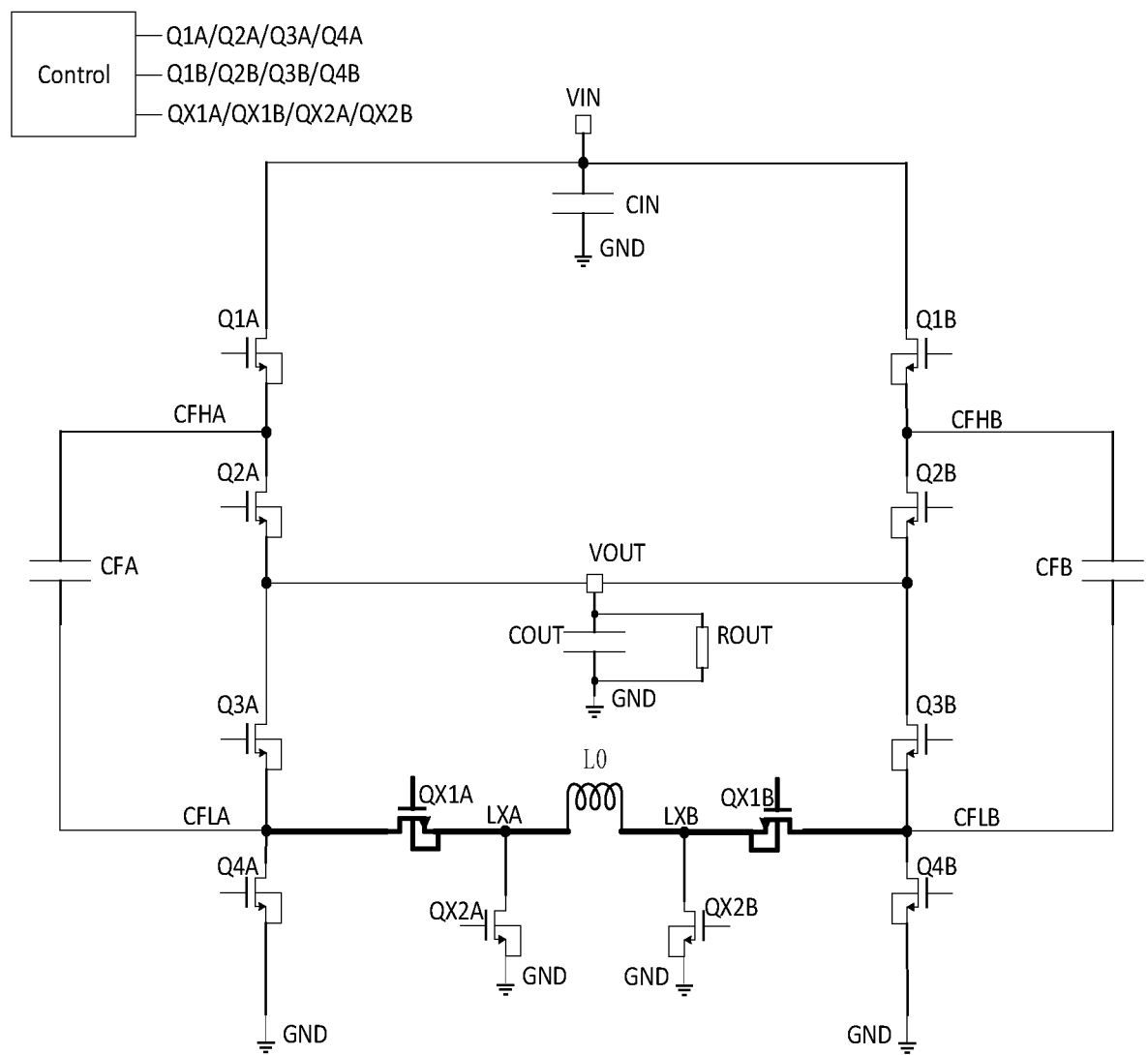
FIG. 7 is a diagram showing a working state of a fourth phase in the first working cycle.

FIG. 7 shows the working state of the switched capacitor voltage converter in the phase 4 (T3-T4). The first switch transistor Q1A, the second switch transistor Q2A, the third switch transistor Q3A, the fourth switch transistor Q4A, the fifth switch transistor Q1B, the sixth switch transistor Q2B, the seventh switch transistor Q3B, and the eighth switch transistor Q4B are all turned off, the tenth switch transistor QX2A and the eleventh switch transistor QX2B are turned off, the ninth switch transistor QX1A and the twelfth switch transistor QX1B are turned on, and the first connection node CFLA and the second connection node CFLB are connected via the ninth switch transistor QX1A, the inductor L0 and the twelfth switch transistor QX1B respectively. When the phase 4 starts, the voltage of the first connection node CFLA is equal to zero, and the voltage of the second connection node CFLB is equal to the output voltage VOUT. When the first connection node CFLA and the second connection node CFLB are connected via the inductor L0, the current of the inductor L0 flows from the node LXB to the node LXA and starts to increase, the voltage of the second connection node CFLB decreases, and the voltage of the first connection node CFLA increases. When the voltage of the first connection node CFLA and the voltage of the second connection node CFLB are equal, the current of the inductor L0 reaches the maximum value and then starts to decrease. When the current of the inductor L0 decreases to zero, the voltage of the second connection node CFLB decreases to zero, the voltage of the node CFHB decreases to the output voltage VOUT, the voltage of the first connection node CFLA increases to the output voltage VOUT, and the voltage of the node CFHA increases to the input voltage VIN, at this time, the controller controls the switch transistors to end the phase 4 state and start the phase 1.

As described above, in the switched capacitor voltage converter of the embodiment of the present application, by controlling the ninth switch transistor QX1A, the ten switch transistor QX2A, the eleventh switch transistor QX2B and the twelfth switch transistor QX1B, in the phase 2, an electric charge or electric charges on the first connection node CFLA and the node CFHA of the first branch A can be can completely transfers to the second connection node CFLB and the node CFHB of the second branch B via the inductor L0, so that in the phase 3, the voltage difference between both terminals of each of the second switch transistor Q2A, the fourth switch transistor Q4A, the fifth switch transistor Q1B and the seventh switch transistor Q3B is zero before the second switch transistor Q2A, the fourth switch transistor Q4A, the fifth switch transistor Q1B and the seventh switch transistor Q3B are turned on. In the phase 4, an electric charge or electric charges on the second connection node CFLB and the node CFHB of the second branch B can be completed transferred to the first connection node CFLA and the node CFHA of the first branch A via the inductor L0, so that, in the phase 1, the voltage difference between both terminals of each of the first switch transistor Q1A, the third switch transistor Q3A, the sixth switch transistor Q2B and the eighth switch transistor Q4B of is zero before the first switch transistor Q1A, the third switch transistor Q3A, the sixth switch transistor Q2B and the eighth switch transistor Q4B are turned on respectively. In this way, the voltage difference between both terminals of each of the first switch transistor Q1A, the second switch transistor Q2A, the third switch transistor Q3A, the fourth switch transistor Q4A, the fifth switch transistor Q1B, the sixth switch transistor Q2B, the seventh switch transistor Q3B and the eighth switch transistor Q4B is zero before the first switch transistor Q1A, the second switch transistor Q2A, the third switch transistor Q3A, the fourth switch transistor Q4A, the fifth switch transistor Q1B, the sixth switch transistor Q2B, the seventh switch transistor Q3B and the eighth switch transistor Q4B are turned on respectively, thereby greatly reducing the switching loss and improving the conversion efficiency of the switched capacitor voltage converter.

Figure 8:
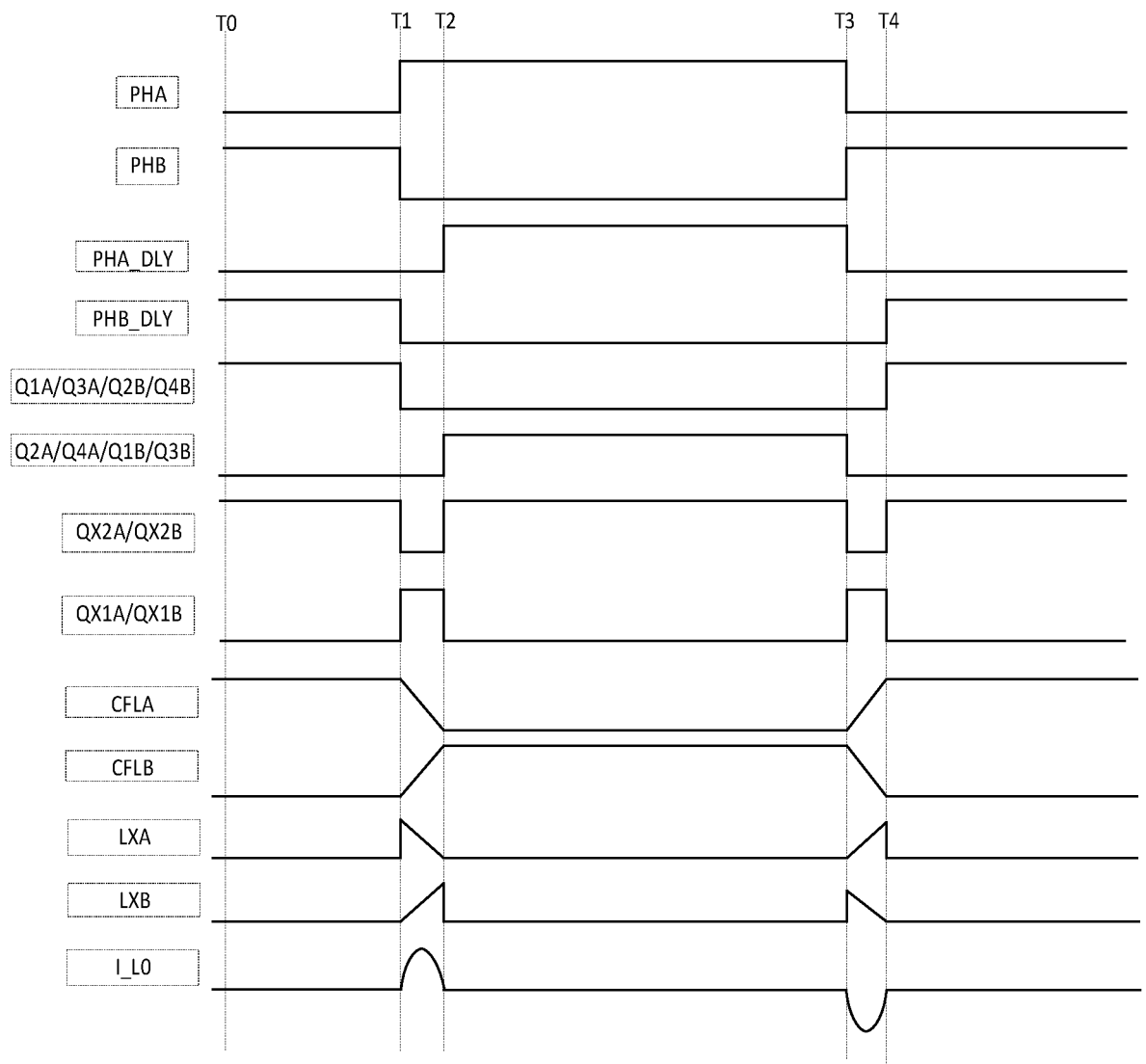
FIG. 8 is a second working cycle diagram of an embodiment of the present application.

The switched capacitor voltage converter shown in FIG. 2 can also work according to another working sequence as shown in FIG. 8, with four working states of phase 1 (T0-T1), phase 2 (T1-T2), phase 3 (T2-T3) and phase 4 (T3-T/4) in sequence within one working cycle, and main difference from the working sequence of FIG. 3 is a control sequence of the ninth switch transistor QX1A, the twelfth switch transistor QX1B, the tenth switch transistor QX2A and the eleventh switch transistor QX2B. This control method according to the control sequence shown in FIG. 8 can also achieve the effect of decreasing the voltage difference between both terminals of each of the first switch transistor Q1A, the second switch transistor Q2A, the third switch transistor Q3A, the fourth switch transistor Q4A, the fifth switch transistor Q1B, the sixth switch transistor Q2B, the seventh switch transistor Q3B and the eighth switch transistor Q4B to zero before the first switch transistor Q1A, the second switch transistor Q2A, the third switch transistor Q3A, the fourth switch transistor Q4A, the fifth switch transistor Q1B, the sixth switch transistor Q2B, the seventh switch transistor Q3B and the eighth switch transistor Q4B are turned on respectively.

Figure 9:
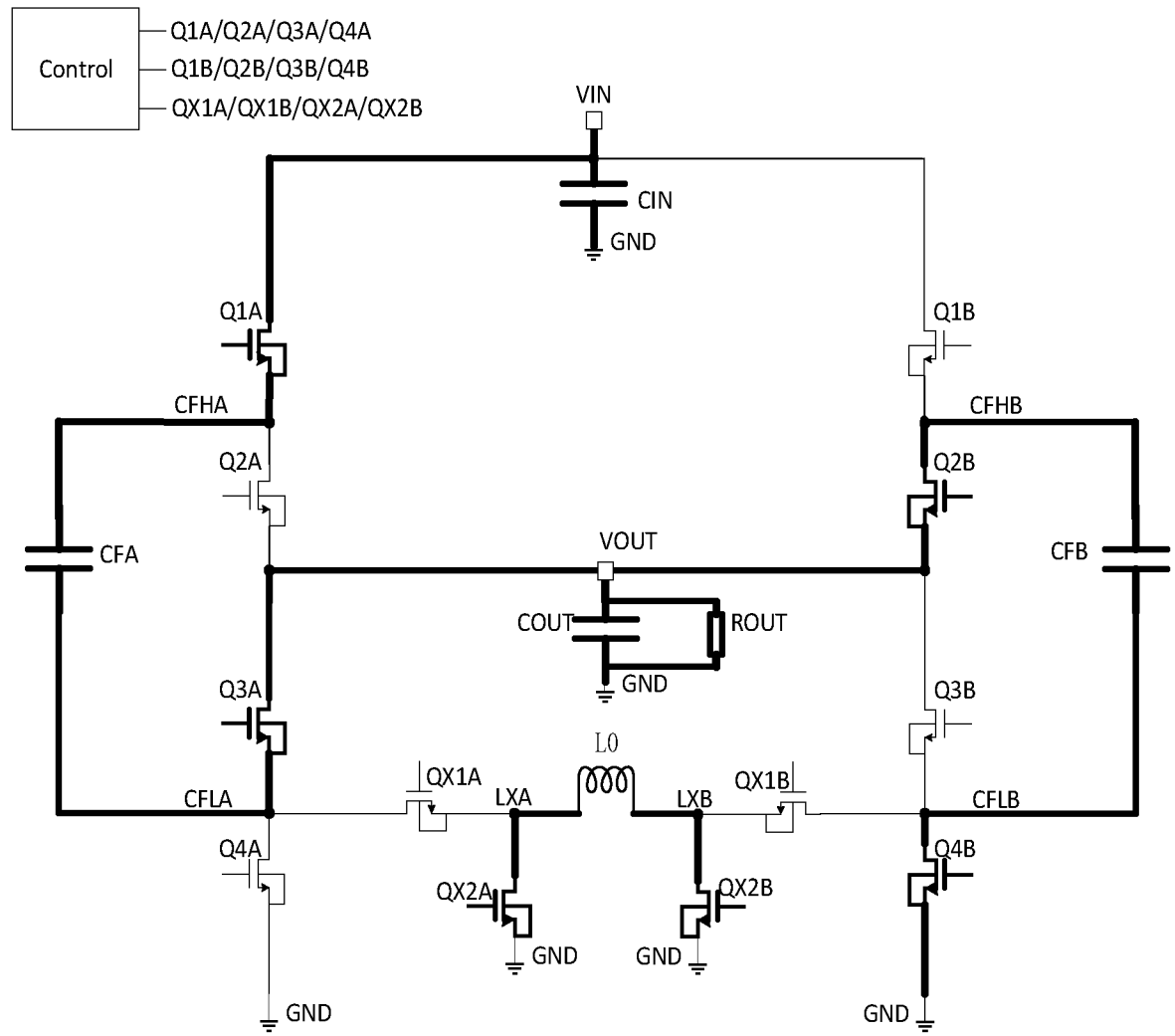
FIG. 9 is a diagram showing a working state of a first phase in the second working cycle as shown in the FIG. 8.

FIG. 9 shows a working state of the switched capacitor voltage converter in the phase 1 (T0-T1). The first switch transistor Q1A and the third switch transistor Q3A are turned on, the second switch transistor Q2A and the fourth switch transistor Q4A are turned off, and the input voltage VIN is connected to the output capacitor COUT via the first capacitor CFA. The fifth switch transistor Q1B and the seventh switch transistor Q3B are turned off, the sixth switch transistor Q2B and the eighth switch transistor Q4B are turned on, and the second capacitor CFB and the output capacitor COUT are connected in parallel. The tenth switch transistor QX2A and the eleventh switch transistor QX2B are turned on, the ninth switch transistor QX1A and the twelfth switch transistor QX1B are turned off, the node LXA is connected to the GND via the tenth switch transistor QX2A, and the node LXB is connected to the GND via the eleventh switch transistor QX2B. When the phase 4 ends and the phase 1 starts, the voltage of the first connection node CFLA is the output voltage VOUT, the voltage of the node CFHA is the input voltage VIN, the voltage difference between both terminals of the third switch transistor Q3A and the voltage difference between both terminals of the first switch transistor Q1A are zero before the third switch transistor Q3A and the first switch transistor Q1A are turned on respectively, and the respective voltage differences of the third switch transistor Q3A and the first switch transistor Q1A do not change before and after being switched on and off. The voltage of the second connection node CFLB is zero, the voltage of the node CFHB is the output voltage VOUT, the voltage difference between both terminals of the eighth switch transistor Q4B and the voltage difference between both terminals of the sixth switch transistor Q2B are zero before the switch transistor Q4B and the sixth switch transistor Q2B are turned on respectively, and the respective voltage differences of the switch transistor Q4B and the sixth switch transistor Q2B do not change before and after being switched on and off. In the phase 1, the voltage of the first connection node CFLA is equal to the output voltage VOUT, the voltage of the second connection node CFLB is equal to zero, the voltage of the node LXA and the voltage of the node LXB are equal to zero, and the current of the inductor L0 is zero.

Figure 10:
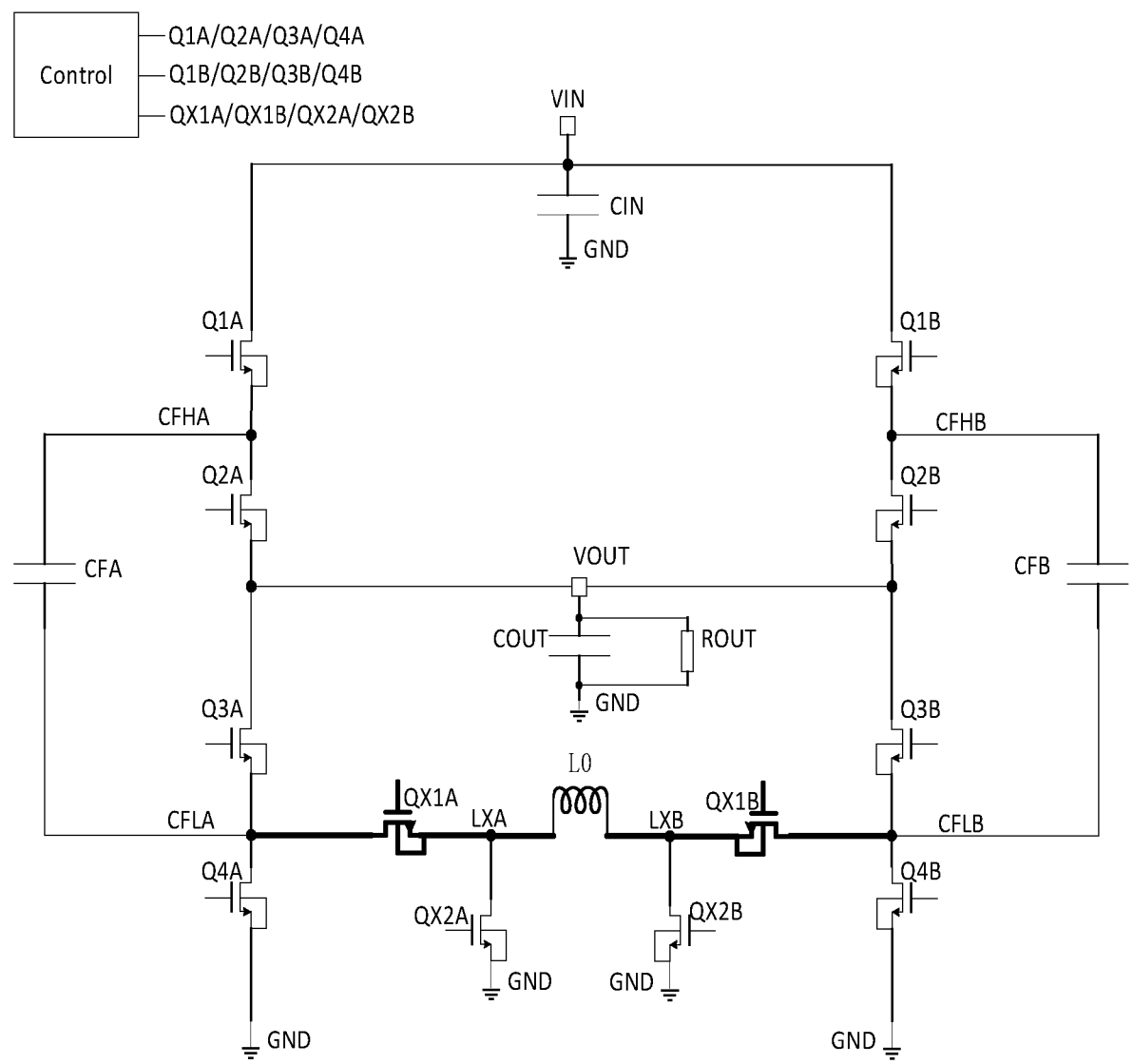
FIG. 10 is a diagram showing a working state of a second phase in the second working cycle as shown in the FIG. 8.

FIG. 10 shows a working state of the switched capacitor voltage converter in the phase 2 (T1-T2). The first switch transistor Q1A, the second switch transistor Q2A, the third switch transistor Q3A, the fourth switch transistor Q4A, the fifth switch transistor Q1B, the sixth switch transistor Q2B, the seventh switch transistor Q3B and the eighth switch transistor Q4B are turned off, the tenth switch transistor QX2A and the eleventh switch transistor QX2B are turned off, the ninth switch transistor QX1A and the twelfth switch transistor QX1B are turned on, and the first connection node CFLA and the second connection node CFLB are connected via the ninth switch transistor QX1A, the inductor L0 and the twelfth switch transistor QX1B respectively. When the phase 2 starts, the voltage of the first connection node CFLA is equal to the output voltage VOUT, and the voltage of the second connection node CFLB is equal to zero, and when the first connection node CFLA and the second connection node CFLB are connected via the inductor L0, the current of the inductor L0 flows from the node LXA to the node LXB and starts to increase, the voltage of the first connection node CFLA decreases, and the voltage of the second connection node CFLB increases. When the voltage of the first connection node CFLA and the voltage of the second connection node CFLB are equal, the current of the inductor L0 reaches the maximum value and then starts to decrease. When the current of the inductor L0 decreases to zero, the voltage of the first connection node CFLA decreases to zero, the voltage of the node CFHA decreases to the output voltage VOUT, the voltage of the second connection node CFLB increases to the output voltage VOUT, and the voltage of the node CFHB increases to the input voltage VIN, at this time, the controller controls the switch transistors to end the phase 2 state and start the phase 3.

Figure 11:
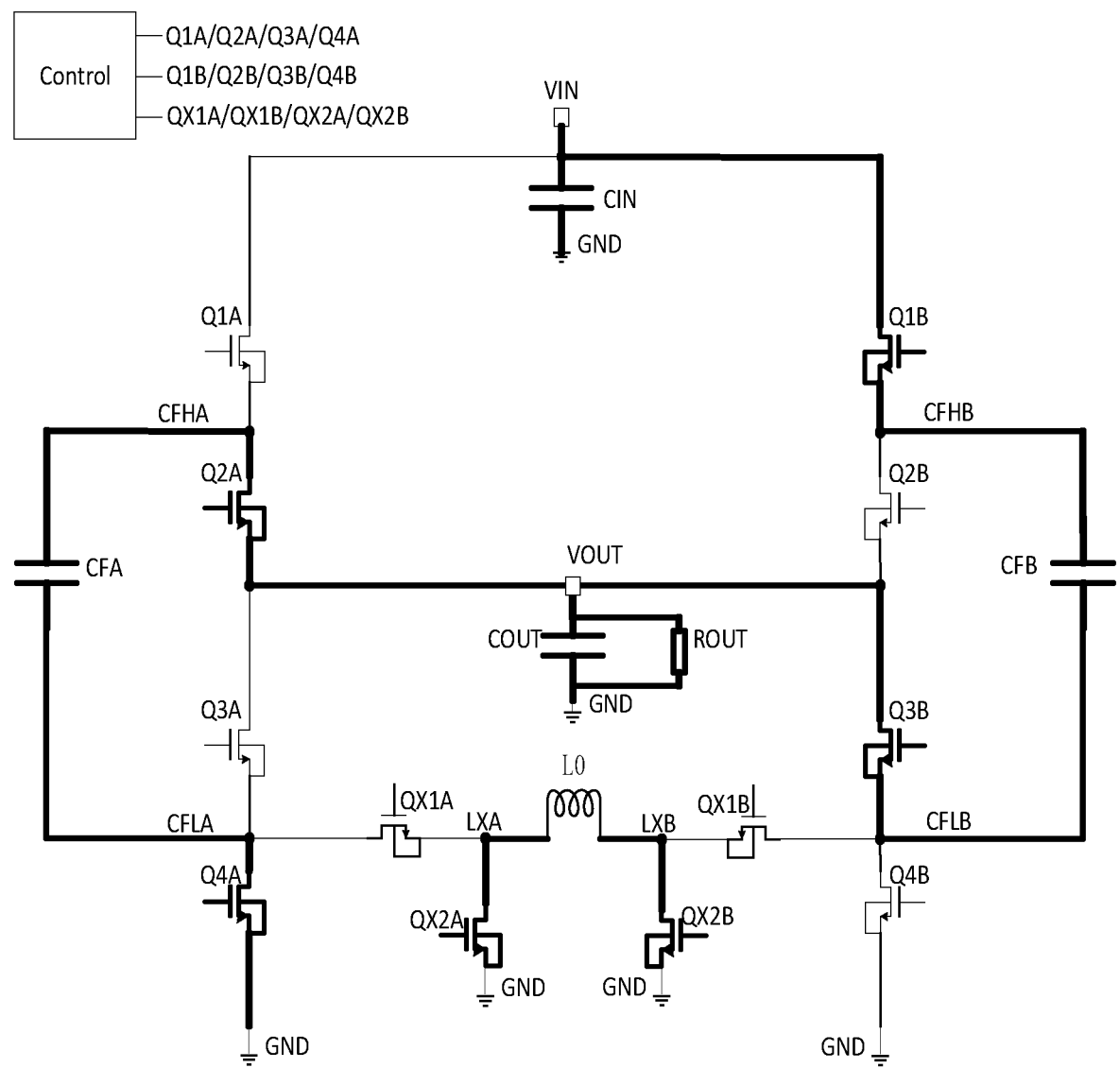
FIG. 11 is a diagram showing a working state of a third phase in the second working cycle as shown in the FIG. 8.

FIG. 11 shows a working state of the switched capacitor voltage converter in the phase 3 (T2-T3). The second switch transistor Q2A and the fourth switch transistor Q4A are turned on, the first switch transistor Q1A and the third switch transistor Q3A are turned off, and the first capacitor CFA and the output capacitor COUT are connected in parallel. The sixth switch transistor Q2B and the eighth switch transistor Q4B are turned off, the fifth switch transistor Q1B and the seventh switch transistor Q3B are turned on, and the input voltage VIN is connected to the output capacitor COUT via the second capacitor CFB. The tenth switch transistor QX2A and the eleventh switch transistor QX2B are turned on, the ninth switch transistor QX1A and the twelfth switch transistor QX1B are turned off, the node LXA is connected to GND via the tenth switch transistor QX2A, and the node LXB is connected to the GND via the eleventh switch transistor QX2B. When the phase 2 ends and the phase 3 starts, the voltage of the first connection node CFLA is zero, the voltage of the node CFHA is the output voltage VOUT, the voltage difference between both terminals of the fourth switch transistor Q4A and the voltage difference between both terminals of the first switch transistor Q1A are zero before the fourth switch transistor Q4A and the first switch transistor Q1A are turned on respectively, and the respective voltage differences of the fourth switch transistor Q4A and the first switch transistor Q1A do not change before and after being switched on and off. The voltage of the second connection node CFLB is the output voltage VOUT, the voltage of the node CFHB is the input voltage VIN, the voltage difference between both terminals of the seventh switch transistor Q3B and the voltage difference between both terminals of the fifth switch transistor Q1B is zero before the seventh switch transistor Q3B and the fifth switch transistor Q1B are turned on respectively, and the respective voltage differences of the seventh switch transistor Q3B and the fifth switch transistor Q1B do not change before and after being switched on and off. In the phase 3, the voltage of the first connection node CFLA is equal to zero, the voltage of the second connection node CFLB is equal to the output voltage VOUT, the voltage of the node LXA and the voltage of the node LXB are equal to zero, and the current of the inductor L0 is zero.

Figure 12:
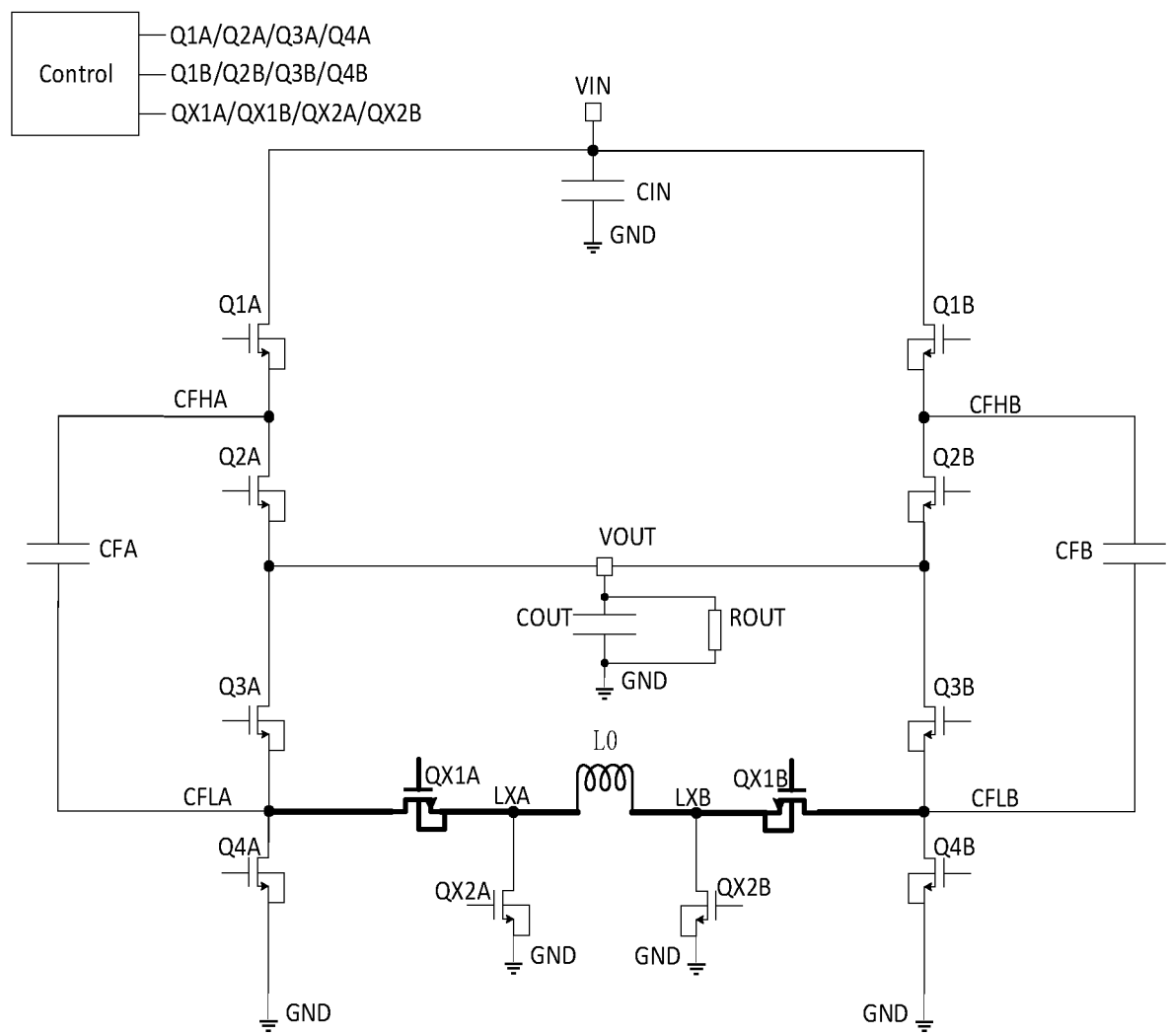
FIG. 12 is a diagram showing a working state of the fourth phase in the second working cycle as shown in the FIG. 8.

FIG. 12 shows a working state of the switched capacitor voltage converter in the phase 4 (T3-T4). The first switch transistor Q1A, the second switch transistor Q2A, the third switch transistor Q3A, the fourth switch transistor Q4A, the fifth switch transistor Q1B, the sixth switch transistor Q2B, the seventh switch transistor Q3B and the eighth switch transistor Q4B are turned off, the tenth switch transistor QX2A and the eleventh switch transistor QX2B are turned off, the ninth switch transistor QX1A and the twelfth switch transistor QX1B are turned on, the first connection node CFLA and the second connection node CFLB are connected via the ninth switch transistor QX1A, the inductor L0 and the twelfth switch transistor QX1B respectively. When the phase 4 starts, the voltage of the first connection node CFLA is equal to zero, and the voltage of the second connection node CFLB is equal to the output voltage VOUT, when the first connection node CFLA and the second connection node CFLB are connected via the inductor L0, the current of the inductor L0 flows from the node LXB to node LXA and starts to increase, the voltage of the second connection node CFLB decreases, and the voltage of the first connection node CFLA increases. When the voltage of the first node CFLA and the voltage of the second node CFLB are equal, the current of the inductor L0 reaches the maximum value and then starts to decrease. When the current of the inductor L0 decreases to zero, the voltage of the second connection node CFLB decreases to zero, the voltage of the node CFHB decreases to the output voltage VOUT, the voltage of the first connection node CFLA increases to the output voltage VOUT, the voltage of the node CFHA increases to the input voltage VIN, at this time, the controller controls the switch transistors to end the phase 4 state and start the phase 1.

In the switched capacitor voltage converter of embodiments of the present application, by controlling the ninth switch transistor QX1A, the tenth switch transistor QX2A, the twelfth switch transistor QX1B and the eleventh switch transistor QX2B according to the above-mentioned two control sequences, in the phase 2, an electric charge or electric charges on the first connection node CFLA and the node CFHA of the first branch A can be transferred to the second connection node CFLB and the node CFHB of the second branch B via the inductor L0, and, in the phase 4, an electric charge or electric charges on the second connection node CFLB and the node CFHB of the second branch B can be transferred to the first connection node CFLA and the node CFHA of the first branch A via the inductor L0, so that the voltage difference between both terminals of each of the first switch transistor Q1A, the second switch transistor Q2A, the third switch transistor Q3A, the fourth switch transistor Q4A, the fifth switch transistor Q1B, the sixth switch transistor Q2B, the seventh switch transistor Q3B and the eighth switch transistor Q4B is zero before the first switch transistor Q1A, the second switch transistor Q2A, the third switch transistor Q3A, the fourth switch transistor Q4A, the fifth switch transistor Q1B, the sixth switch transistor Q2B, the seventh switch transistor Q3B and the eighth switch transistor Q4B are turned on respectively, which greatly reduces the switching loss and improves the conversion efficiency of the switched capacitor voltage converter.

The structure and control method of the switched capacitor voltage converter of the above embodiments of the present application are applicable not only to the two-branch parallel 2:1 switched capacitor voltage converter of the above example, but also to switched capacitor voltage converters with other structures.

Certainly, implementation models of the inductive current described in the present application are also various, and the type and number of the switch transistors used are not limited to the four N-transistors in the above example, but may be other numbers of other types of tubes or diodes. The added inductor and switch transistors are also not limited to be connected between CFLA and CFLB, but may also be connected between the node CFHA and the node CFHB, such as in FIGS. 13 and 14.

Figure 13:
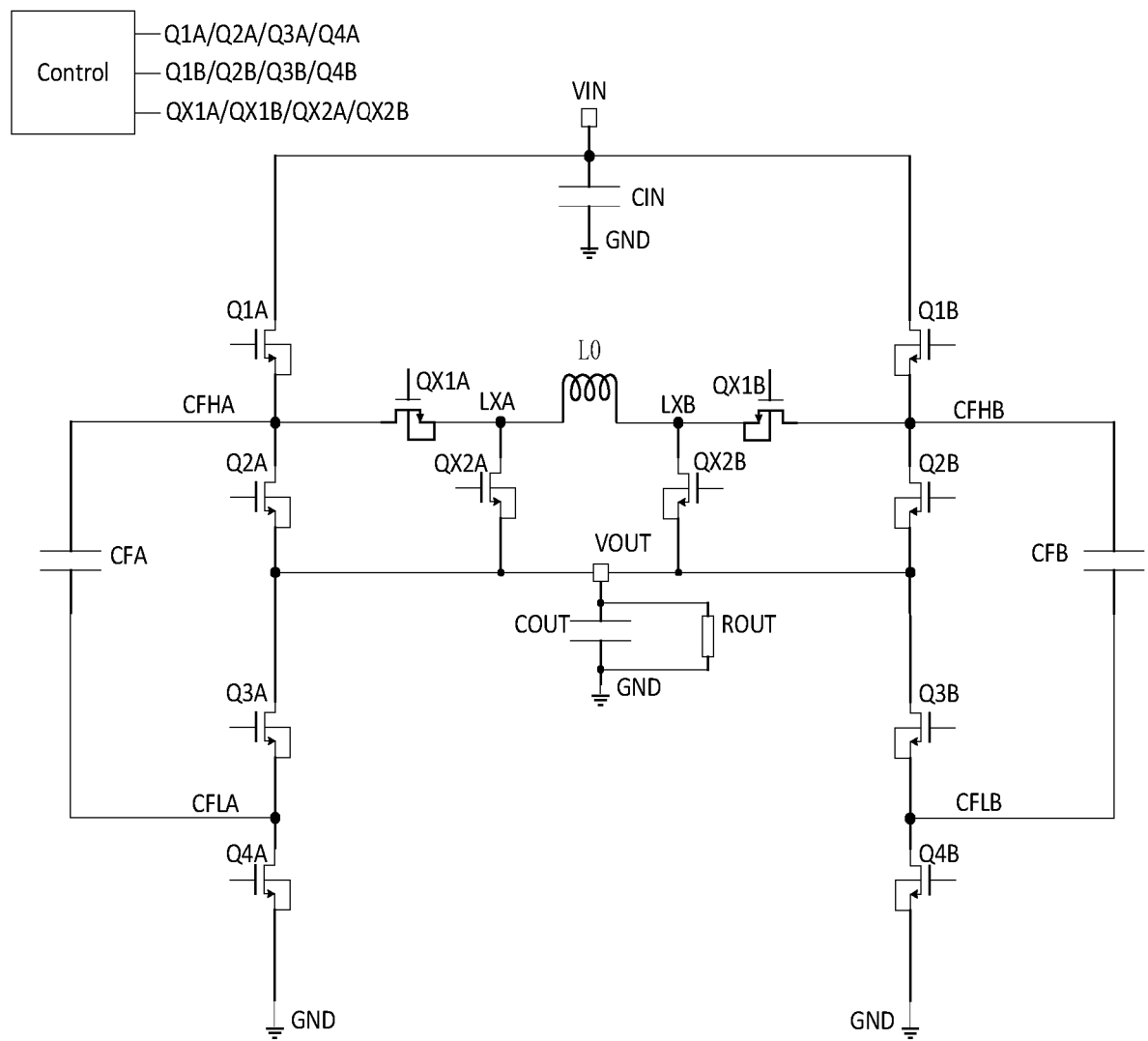
FIG. 13 is a schematic diagram of a second circuit structure of a two-branch parallel 2:1 switched capacitor voltage converter of another embodiment of the present application.

FIG. 13 shows another circuit of a switched capacitor voltage converter of another embodiment of the present application, the switched capacitor voltage converter of FIG. 13 includes an inductive branch, a first branch and a second branch, and the first branch and the second branch of the switched capacitor voltage converter of FIG. 13 are as same as that of the switched capacitor voltage converter of FIG. 2 respectively, and the inductive branch of the switched capacitor voltage converter of FIG. 13 has a below circuit connection relation.

The inductive branch of the switched capacitor voltage converter of FIG. 13 includes a ninth switch transistor QX1A, a tenth switch transistor QX2A, an eleventh switch transistor QX2B, a twelfth switch transistor QX1B and an inductor L0.

A connection node CFHA of the first terminal of the first capacitor CFA, the second terminal of the first switch transistor Q1A and the first terminal of the second switch transistor Q2A is connected to a first terminal of the ninth switch transistor QX1A, a second terminal of the ninth switch transistor QX1A is connected to a first terminal of the tenth switch transistor QX2A and a first terminal of the inductor L0, and a second terminal of the tenth switch transistor QX2A is connected to the output terminal of the switched capacitor voltage converter.

A connection node CFHB of the first terminal of the second capacitor CFB, the second terminal of the fifth switch transistor Q1B and the first terminal of the sixth switch transistor Q2B is connected to a second terminal of the twelfth switch transistor QX1B, a first terminal of the twelfth switch transistor QX1B is connected to a first terminal of the eleventh switch transistor QX2B and a second terminal of the inductor L0, and a second terminal of the eleventh switch transistor QX2B is connected to the output terminal of the switched capacitor voltage converter.

Figure 14:
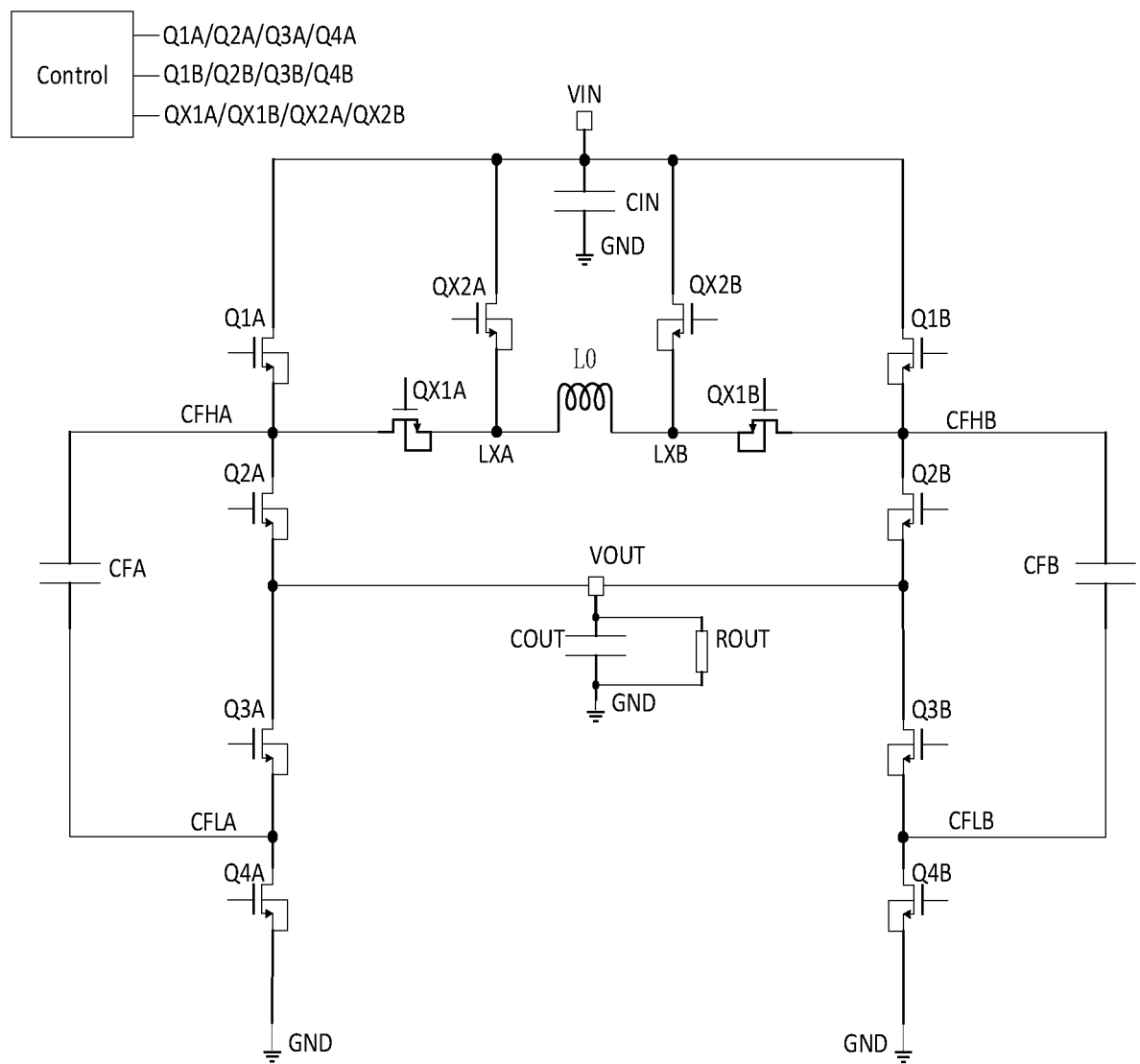
FIG. 14 is a schematic diagram of a third circuit structure of a two-branch parallel 2:1 switched capacitor voltage converter of another embodiment of the present application.

FIG. 14 shows another circuit of a switched capacitor voltage converter of another embodiment of the present application, the switched capacitor voltage converter of FIG. 14 includes an inductive branch, a first branch and a second branch, and the first branch and the second branch of the switched capacitor voltage converter of FIG. 14 are as same as that of the switched capacitor voltage converter of FIG. 2 respectively, and the inductive branch of the switched capacitor voltage converter of FIG. 14 has a below circuit connection relation.

The inductive branch of the switched capacitor voltage converter of FIG. 14 includes a ninth switch transistor QX1A, a tenth switch transistor QX2A, an eleventh switch transistor QX2B, a twelfth switch transistor QX1B and an inductor L0.

A connection node CFHA of the first terminal of the first capacitor CFA, the second terminal of the first switch transistor Q1A and the first terminal of the second switch transistor Q2A is connected to a first terminal of the ninth switch transistor QX1A, a second terminal of the ninth switch transistor QX1A is connected to a first terminal of the tenth switch transistor QX2A and a first terminal of the inductor L0, and a second terminal of the tenth switch transistor QX2A is connected to the input terminal of the switched capacitor voltage converter.

A connection node CFHB of the first terminal of the second capacitor CFB, the second terminal of the fifth switch transistor Q1B and the first terminal of the sixth switch transistor Q2B is connected to a second terminal of the twelfth switch transistor QX1B, a first terminal of the twelfth switch transistor QX1B is connected to a first terminal of the eleventh switch transistor QX2B and a second terminal of the inductor L0, and a second terminal of the eleventh switch transistor QX2B is connected to the input terminal of the switched capacitor voltage converter.

The control sequence is not limited to the above two control sequences, and other control sequences may be used to control the switch transistors to transfer the electric charges on one branch completely to the another branch via the inductor within a short period of time when the primary switch transistors are turned off, so that the effect of zero voltage switching is also achieved, thereby improving the conversion efficiency of the switched capacitor voltage converter.

Since the specific implementation models of the circuit structure are various, and the corresponding control methods are also various, they cannot be exemplified one by one in the present application, after those skilled in the art understand the contents of the present application, various modifications, variations or equivalents of the above described examples may be readily conceived, but still be controlled by the limitations set forth in the claims and any equivalents thereof.

What is claimed is:

1. A switched capacitor voltage converter, wherein the switched capacitor voltage converter is a two-branch parallel 2:1 switched capacitor voltage converter and comprises an inductive branch and two branches, wherein the two branches comprise a first branch and a second branch, and an external input voltage, upon travelling via the two branches, is converted into another voltage and output;

the inductive branch is connected between the first branch and the second branch, and switch transistors in the first branch and the second branch are primary switch transistors; and the inductive branch is configured to transfer an electric charge or electric charges on parasitic capacitors of one branch to another branch of the two branches after all the primary switch transistors are turned off, so that a voltage difference between both terminals of each of the primary switch transistors becomes zero, and then the each of the primary switch transistors is turned on, the voltage difference between both terminals of the each of the primary switch transistors becomes zero at an instant when the each of the primary switch transistors is turned on respectively, wherein the first branch comprises a first switch transistor, a second switch transistor, a third switch transistor, a fourth switch transistor and a first capacitor, and the second branch comprises a fifth switch transistor, a sixth switch transistor, a seventh switch transistor, an eighth switch transistor and a second capacitor;

wherein a first terminal of the first switch transistor and a first terminal of the fifth switch transistor are connected to an input terminal of the switched capacitor voltage converter, the input terminal is connected to the external input voltage, a second terminal of the first switch transistor is connected to a first terminal of the second switch transistor and a first terminal of the first capacitor, and a second terminal of the fifth switch transistor is connected to a first terminal of the sixth switch transistor and a first terminal of the second capacitor;

a second terminal of the second switch transistor is connected to a first terminal of the third switch transistor, and a second terminal of the sixth switch transistor is connected to a first terminal of the seventh switch transistor;

a second terminal of the third switch transistor is connected to a second terminal of the first capacitor and a first terminal of the fourth switch transistor, and a second terminal of the seventh switch transistor is connected to a second terminal of the second capacitor and a first terminal of the eighth switch transistor;

a second terminal of the fourth switch transistor and a second terminal of the eighth switch transistor are grounded; and the second terminal of the second switch transistor, the first terminal of the third switch transistor, the second terminal of the sixth switch transistor and the first terminal of the seventh switch transistor are connected to an output terminal of the switched capacitor voltage converter.

2. The switched capacitor voltage converter according to claim 1, wherein the inductive branch comprises a ninth switch transistor, a tenth switch transistor, an eleventh switch transistor, a twelfth switch transistor and an inductor;

the second terminal of the first capacitor, the second terminal of the third switch transistor and the first terminal of the fourth switch transistor are connected to a first connection node, and the second terminal of the second capacitor, the second terminal of the seventh switch transistor and the first terminal of the eighth switch transistor are connected to a second connection node, and a first terminal of the ninth switch transistor is connected to the first connection node, a second terminal of the ninth switch transistor is connected to a first terminal of the tenth switch transistor and a first terminal of the inductor, and a second terminal of the tenth switch transistor is grounded; and a second terminal of the inductor is connected to a first terminal of the eleventh switch transistor and a first terminal of the twelfth switch transistor, a second terminal of the eleventh switch transistor is grounded, and a second terminal of the twelfth switch transistor is connected to the second connection node.

3. The switched capacitor voltage converter according to claim 1, wherein the inductive branch comprises a ninth switch transistor, a tenth switch transistor, an eleventh switch transistor, a twelfth switch transistor and an inductor;

the first terminal of the first capacitor, the second terminal of the first switch transistor and the first terminal of the second switch transistor are connected to a first terminal of the ninth switch transistor, a second terminal of the ninth switch transistor is connected to a first terminal of the tenth switch transistor and a first terminal of the inductor, and a second terminal of the tenth switch transistor is connected to the output terminal of the switched capacitor voltage converter; and the first terminal of the second capacitor, the second terminal of the fifth switch transistor and the first terminal of the sixth switch transistor are connected to a second terminal of the twelfth switch transistor, a first terminal of the twelfth switch transistor is connected to a first terminal of the eleventh switch transistor and a second terminal of the inductor, and a second terminal of the eleventh switch transistor is connected to the output terminal of the switched capacitor voltage converter.

4. The switched capacitor voltage converter according to claim 1, wherein the inductive branch comprises a ninth switch transistor, a tenth switch transistor, an eleventh switch transistor, a twelfth switch transistor and an inductor;

the first terminal of the first capacitor, the second terminal of the first switch transistor and the first terminal of the second switch transistor are connected to a first terminal of the ninth switch transistor, a second terminal of the ninth switch transistor is connected to a first terminal of the tenth switch transistor and a first terminal of the inductor, and a second terminal of the tenth switch transistor is connected to the input terminal of the switched capacitor voltage converter; and the first terminal of the second capacitor, the second terminal of the fifth switch transistor and the first terminal of the sixth switch transistor are connected to a second terminal of the twelfth switch transistor, a first terminal of the twelfth switch transistor is connected to a first terminal of the eleventh switch transistor and a second terminal of the inductor, and a second terminal of the eleventh switch transistor is connected to the input terminal of the switched capacitor voltage converter.

5. The switched capacitor voltage converter according to claim 2, wherein a first working cycle of the switched capacitor voltage converter comprises four phases in sequence as follows:
   a first phase: the first switch transistor, the third switch transistor, the sixth switch transistor, the eighth switch transistor, the tenth switch transistor and the twelfth switch transistor are turned on, and remaining switch transistors are turned off, wherein the external input voltage is connected to the output terminal via the first capacitor, the second capacitor is connected between the output terminal and a ground, and a current on the inductor is 0;
   a second phase: the ninth switch transistor and the twelfth switch transistor are turned on, and remaining switch transistors are turned off, the first connection node and the second connection node are connected via the ninth switch transistor, the inductor and the twelfth switch transistor respectively, the current on the inductor increases and then decreases until the current on the inductor decreases to 0, and the second phase ends when the current on the inductor decreases to 0;
   a third phase: the second switch transistor, the fourth switch transistor, the fifth switch transistor, the seventh switch transistor, the ninth switch transistor and the eleventh switch transistor are turned on, and remaining switch transistors are turned off, wherein the first capacitor is connected between the output terminal and the ground, and the external input voltage is connected to the output terminal via the second capacitor, and the first connection node is connected to the ground via the ninth switch transistor, the inductor and the eleventh switch transistor respectively; and the current on the inductor is 0; and
   a fourth phase: the ninth switch transistor and the twelfth switch transistor are turned on, and remaining switch transistors are turned off, and the first connection node and the second connection node are connected via the ninth switch transistor, the inductor and the twelfth switch transistor respectively, and the current on the inductor increases and then decreases until the current on the inductor decreases to 0, and the fourth phase ends and the first phase is entered when the current on the inductor decreases to 0.

6. The switched capacitor voltage converter according to claim 2, wherein a second working cycle of the switched capacitor voltage converter comprises four phases in sequence as follows:
   a first phase: the first switch transistor, the third switch transistor, the sixth switch transistor, the eighth switch transistor, the tenth switch transistor and the eleventh switch transistor are turned on, and remaining switch transistors are turned off, wherein the external input voltage is connected to the output terminal via the first capacitor, the second capacitor is connected between the output terminal and a ground, and a current on the inductor is 0;
   a second phase: the ninth switch transistor and the twelfth switch transistor are turned on, and remaining switch transistors are turned off, the first connection node and the second connection node are connected via the ninth switch transistor, the inductor and the twelfth switch transistor respectively, and the current on the inductor increases and then decreases until the current on the inductor decreases to 0, and the second phase ends when the current on the inductor decreases to 0;
   a third phase: the second switch transistor, the fourth switch transistor, the fifth switch transistor, the seventh switch transistor, the tenth switch transistor and the eleventh switch transistor are turned on, and remaining switch transistors are turned off, wherein the first capacitor is connected between the output terminal and the ground, the external input voltage is connected to the output terminal via the second capacitor, and both terminals of the inductor are connected to the ground via the tenth switch transistor and the eleventh switch transistor respectively, and the current on the inductor is 0; and
   a fourth phase: the ninth switch transistor and the twelfth switch transistor are turned on, and remaining switch transistors are turned off, and the first connection node and the second connection node are connected via the ninth switch transistor, the inductor and the twelfth switch transistor respectively, and the current on the inductor increases and then decreases until the current on the inductor decreases to 0, and the fourth phase ends and the first phase is entered when the current on the inductor decreases to 0.

* * * * *